United States Patent
Fuchs et al.

(10) Patent No.: US 8,403,336 B2
(45) Date of Patent: Mar. 26, 2013

(54) SEALING ELEMENT FOR HOUSING OF A HAND POWER TOOL

(75) Inventors: Wolfgang Fuchs, Filderstadt (DE); Heiko Roehm, Stutggart (DE); Juergen Gairing, Stuttgart (DE); Jens Blum, Filderstadt (DE)

(73) Assignee: Robert Bosch GmbH, Stuttgart (DE)

( * ) Notice: Subject to any disclaimer, the term of this patent is extended or adjusted under 35 U.S.C. 154(b) by 1335 days.

(21) Appl. No.: 11/188,545

(22) Filed: Jul. 25, 2005

(65) Prior Publication Data

US 2006/0033290 A1 Feb. 16, 2006

(30) Foreign Application Priority Data

Jul. 30, 2004 (DE) .................... 10 2004 037 168

(51) Int. Cl.
*F16J 15/32* (2006.01)
*B25F 5/02* (2006.01)
(52) U.S. Cl. .................. 277/553; 277/549; 173/171
(58) Field of Classification Search ............... 173/162.1, 173/162.2, 171, DIG. 1
See application file for complete search history.

(56) References Cited

U.S. PATENT DOCUMENTS

| 4,158,246 | A | * | 6/1979 | Meadows et al. | .................. | 15/28 |
| 4,476,602 | A | * | 10/1984 | Hurn et al. | .................. | 15/28 |
| 4,784,396 | A | * | 11/1988 | Scott et al. | .................. | 277/598 |
| 4,964,398 | A | * | 10/1990 | Jones | .................. | 601/101 |
| 5,692,574 | A | | 12/1997 | Terada | | |
| 5,718,014 | A | * | 2/1998 | deBlois et al. | .................. | 15/22.1 |
| 6,226,877 | B1 | | 5/2001 | Ono | | |
| 6,248,007 | B1 | * | 6/2001 | deBlois et al. | .................. | 451/344 |
| 6,805,207 | B2 | * | 10/2004 | Hagan et al. | .................. | 173/170 |
| 7,004,357 | B2 | * | 2/2006 | Shew | .................. | 222/256 |

FOREIGN PATENT DOCUMENTS

EP 0 489 277 6/1996

* cited by examiner

*Primary Examiner* — Lindsay Low
(74) *Attorney, Agent, or Firm* — Michael J. Striker

(57) ABSTRACT

A hand power tool has a housing with having at least two housing parts. A sealing element provides mounting of the housing parts on one another fluid-tightly. The housing parts have short sides with which the housing parts abut against one another with interposition of a sealing element. The sealing element is fixed on one of the housing parts.

14 Claims, 5 Drawing Sheets

SEALING ELEMENT FOR HOUSING OF A HAND POWER TOOL

CROSS-REFERENCE

The invention described and claimed hereinbelow is also described in DE 102004037168.7, filed Jul. 30, 2004. This German Patent Application, whose subject matter is incorporated here by reference, provides the basis for a claim of priority of invention under 35 U.S.C. 119 (a)-(d).

BACKGROUND OF THE INVENTION

The present invention relates to a hand power tool.

For sealing off oil- or grease-filled hollow spaces, such as a transmission chamber, of hand power tools, it is usual to insert a separate seal of paper or elastomer into the seams, to be sealed off, between housing parts. This assures that grease or oil cannot get out of the grease chamber into adjacent function chambers or into the open air. The sealing element is necessary, since the contact face between plastic or metal housing parts is manufactured inexpensively and therefore with wide tolerances. These housing parts are designed from the outset such that they are not sufficiently tight until they have been fully assembled.

The flexible components acting as a seal are placed in corresponding grooves in the housing parts and fill up the interstice between housing parts in a sealing way. The time required for assembly is comparatively high—as is the risk of mistakes in assembly.

SUMMARY OF THE INVENTION

Accordingly, it is an object of the present invention to provide a hand power tool which eliminates the disadvantages of the prior art.

In keeping with these objects and with others which will become apparent hereinafter, one feature of the present invention resides, briefly stated, in a hand power tool, comprising a housing having at least two housing parts, sealing means providing mounting of said housing parts on one another fluid-tightly, said housing parts having short sides with which said housing parts abut against one another with interposition sealing means, said sealing means being fixed on one of said housing parts.

When the hand power tool is designed in accordance with the present invention it has the advantage that a housing has been created from a plurality of parts that can be joined together quickly, securely, and especially tightly without sealing means that have to be installed separately.

Elastomer is solidly joined to one or more of the housing parts, which form a separate chamber that is to be sealed off. This dispenses with the effort and expense of installation for the separate seal, shipping it, logistics, and keeping it in inventory. Moreover, the risk of incorrect installation with the attendant leaks in equipment is low. Because the installation steps for building in a separate seal are dispensed with, the installation space for the sealing function, that is, the sealing gap, can be optimized and kept smaller.

A further advantage of the invention is that inspection flaps and the like, designed according to the invention, on the housing of the hand power tool can be sealed off again arbitrarily often after opening and re-closure for repair and maintenance work, without replacing a separate sealing element, as must be done for instance with the paper seal.

To that end, one or more housing parts, which form the grease- or oil-filled chamber, are fixedly equipped with an elastomer component, which are braced sealingly against another housing part and upon closure of the housing parts perform the intended sealing function. To that end, in the case of plastic housing parts, the 2-K process should be provided, in which immediately after the injection molding, the thermoplastic hard component, such as PA6, ABS, PP, or PC, each with or without a glass fiber component, is installed, and after that the soft component, such as thermoplastic elastomer or rubber, is installed.

The connection between the hard and soft components either exists by adhesion of the two materials to one another or can be additionally reinforced by form locking, such as back-injection molding. A separate adhesive component as a third material is then omitted.

A further advantage of this invention is the reduction in the installation space required for the sealing function. Because the elastomer is seated firmly on its substrate, which is the housing part, the cross section of the seal can be minimized and designed for only the sealing function. Until now, cross sections of the elastomer material had to be designed also for handling during installation, in other words with sufficient intrinsic strength before and during assembly, and were thus larger than actually required for the sealing function itself. Furthermore, the receiving geometry of the housing for the separate seal had to assure rapid, mistake-free assembly. Typically, this was assured by insertion chamfers and large spacings from other function geometries. These provisions as well can now be omitted entirely or made smaller.

Another advantage of this invention is that the sealing assembly process is replaced with an additional, short work operation in the manufacture of the housing, which is preferably performed in automated fashion.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 4 through 7b show further variants of tongue-and-groove sealing seams;

DESCRIPTION OF THE PREFERRED EMBODIMENT

Figure 1:
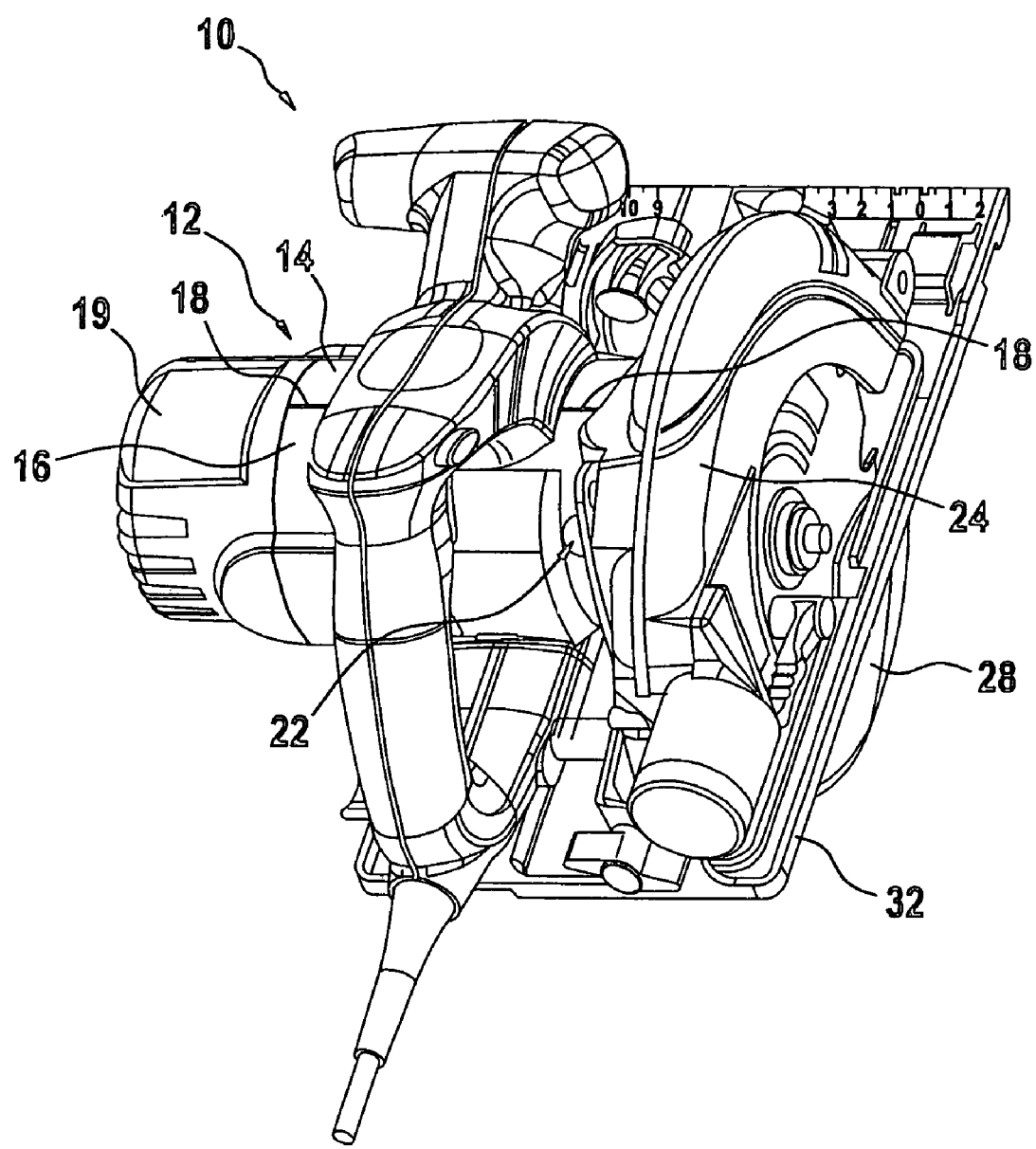
FIG. 1 shows a detail of a hand power tool with a sealed-off butt seam.

The hand power tool 10 shown in FIG. 1 is designed as a compass saw and has a housing 12. The housing comprises a right and a left half-shell 14, 16, which are joined to one another along a central sealing seam 18, where they form the face end 19 of the housing 12. Behind the face end 19, there is a transmission chamber 22 designed as a grease- or oil-filled chamber.

The half-shells 14, 16 are of thermoplastic plastic, and one of them, at the edge of the sealing seam 18, is provided with a soft component which, among other functions, performs a sealing function. The contact partner for this soft component is the diametrically opposite half-shell without a soft component. In other regions of the housing, an inserted part, such as a ball bearing, a bearing bridge, or for instance a push button 20, can be used as the contact partner, which is protected especially well against the escape of grease from the inside outward and against the penetration of dust and dirt from the outside inward.

The production of the half-shell with a soft component can be done by 2-K technology, in which first the hard component and then the soft component are injected in the same mold, such as an injection mold. The cavity for the soft component is realized by opening slides, after injection of the hard component, or in two separate casting molds. Among other elements, thermoplastic elastomer, which must be compatible with the grease or oil in the transmission chamber 22, can be used as the soft component.

At the bottom, a lifting rod 24 emerges from the transmission chamber 22, and a sawblade 28 is secured to its free end and passes through a foot plate 32 of the compass saw and is used for machining a workpiece, not shown, that braces the foot plate 32.

Figure 2:
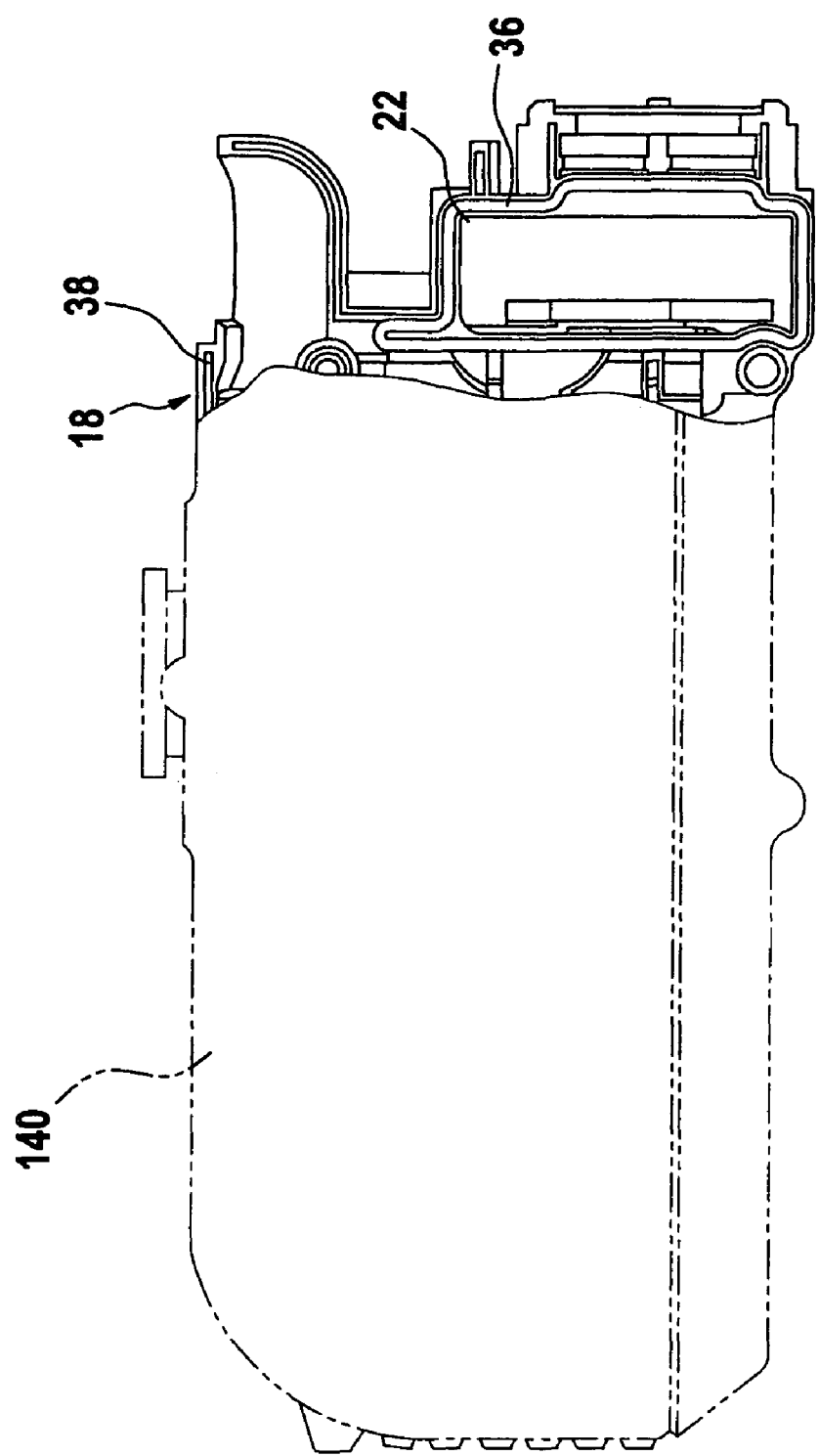
FIG. 2 is a top view on a half-shell of the housing, with the seal of the invention.

FIG. 2 shows the top view on the inside of one half-shell 140, whose outer edge, extending all the way around, serves as a sealing seam 18, with a further half-shell, not shown. The edge is designed as a groove 38, and only in the region of the transmission chamber 220, located on the right in the viewing direction, does it have a sealing lip 36, of elastic soft plastic, that is located deep in the interior (FIG. 3).

Figure 3:
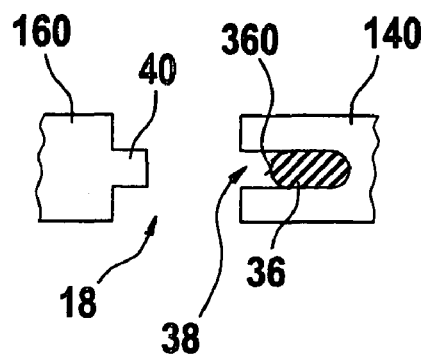
FIG. 3 shows the cross section of a tongue-and-groove sealing seam.

FIG. 3 shows the cross section of the right and left half-shells 160, 140 in the region of the sealing groove 38; a spring 40 engages the middle of this groove and is braced against the sealing lip 36, which has a round contact contour 360 and is seated in the interior.

Figure 4:
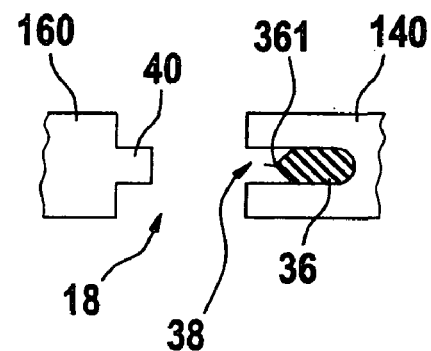

FIG. 4 shows in principle the same construction comprising the tongue-and-groove connection 38, 40, but the sealing lip 36 has a pointed contact contour 361.

Figure 5A:
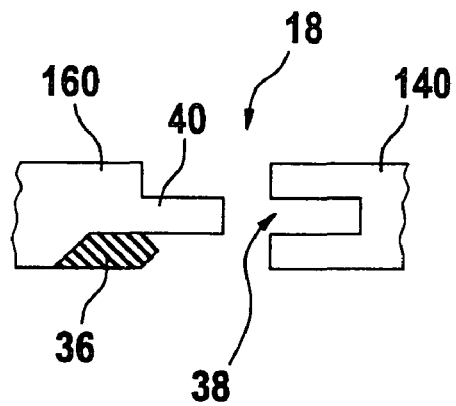

FIG. 5a shows a tongue-and-groove connection 38, 40, in which the sealing lip 36 is located laterally directly beside the spring 40 on the side that is provided with a spring and is meant to come into contact sealingly with the other half-shell 140 on the outside, in front of the groove 38.

Figure 5B:
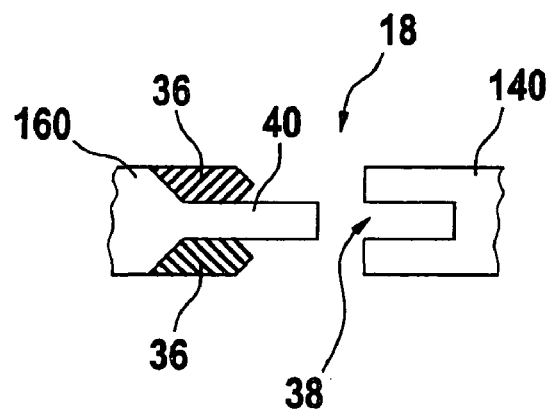

FIG. 5b shows a dual arrangement of the sealing lip 36 on both sides of the spring 40.

Figure 6A:
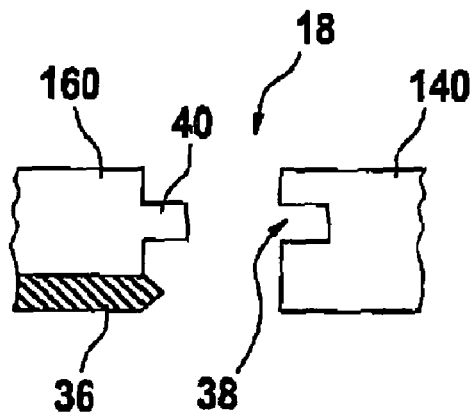

FIG. 6a shows a sealing lip 36 located on the outside of the half-shell 160, near the spring 40, and this sealing lip is meant to come sealingly into contact with the outer face end of the groove 38.

Figure 6B:
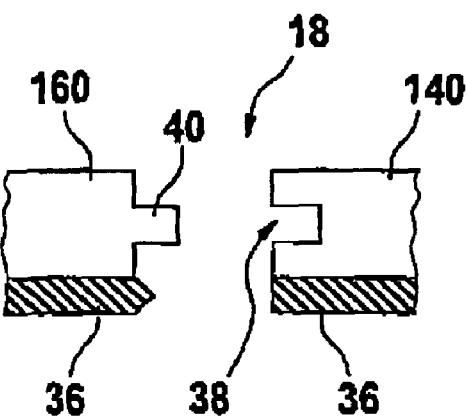
Figure 5A:
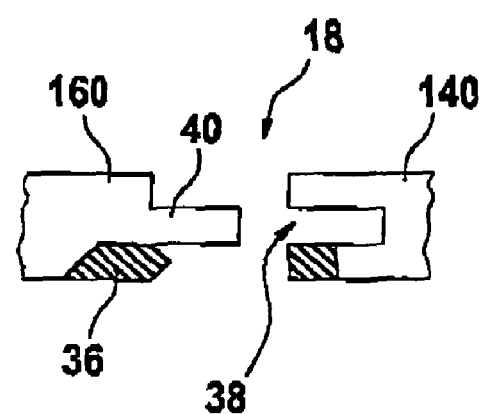
Figure 5B:
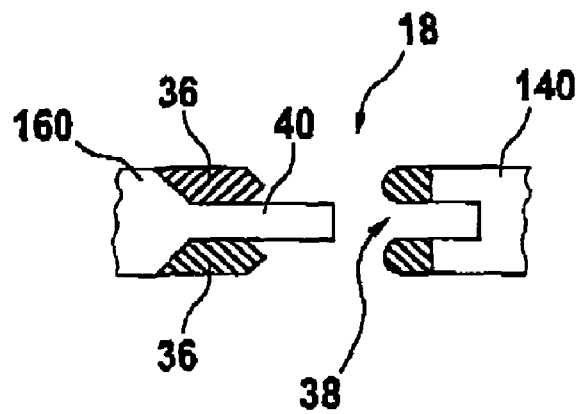

FIG. 6b shows sealing lips 36, positioned in a dual arrangement as in FIG. 6a, for each of the two half-shells 160, 140.

FIG. 7a shows a variant of FIG. 5a, in which the sealing lip 36 on the side provided with the spring 40 is assigned a sealing lip 36 on the side, forming the groove edge, of the half-shell 140, and these sealing lips are intended to rest sealingly against one another in the installed position.

FIG. 7b shows the variant of FIG. 7a, with a dual version on each of the two sides.

Figure 8:
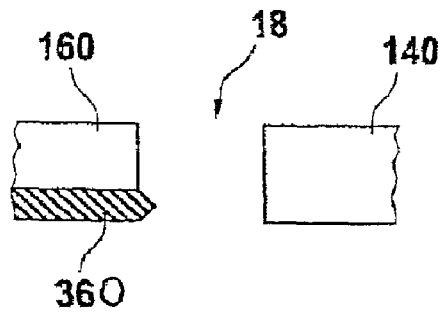
FIGS. 8 through 10 show three variants of sealing seams that abut one another at butt joints.
Figure 9:
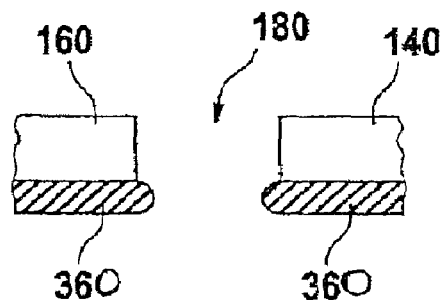
Figure 10:
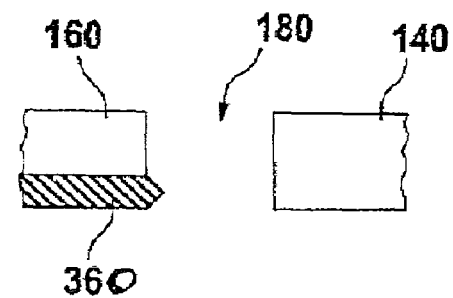

FIGS. 8 through 10 show butt-joined sealing seams 180, which with a sealing lip 360 on one side, that is, on one of the half-shells 14, 16, or in a dual arrangement, one on each of the two half-shells in the region of the sealing seam, such that in the installed position of the half-shells 14, 16, the sealing lips are braced on the opposite side; the opposite side is then the hard material of the housing plastic, or the soft material of the counterpart sealing lip 360, as applicable. The sealing lips 360 may have round or sharp-edged contours.

Figure 11:
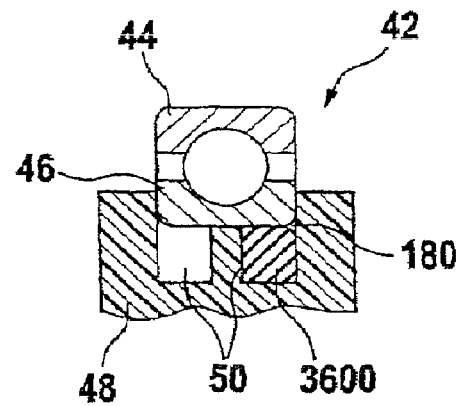
FIG. 11 shows a ball bearing seat having the seal of the invention.

FIG. 11 shows a cross section of a bearing seat 42. A roller bearing 44, with its inner ring 46, engages this bearing seat via a housing profile 48 adapted dimensionally to the inner ring 46; the housing profile 48 forms two U-shaped annular grooves 50, one of which receives a sealing lip 3600, which compensates for uneven features between the inner ring 46 and the housing profile 48 and rests sealingly with a certain initial tension against the inner face of the inner ring 46, so that no lubricant can escape to the outside, and no dust or dirt or moisture from the outside can get into the inside, behind the roller bearing, for instance into a drive chamber.

The attainable sealing course in the half-shells 14, 16 can be adopted also for housings of cup construction, in which cylindrical housing portions abut annular sealing seams. The sealing contour need not be closed, as shown, if the requirement for sealing does not include all the locations in space of the product.

When the two housing parts are joined together, the soft component deforms. This compensates for uneven features at the housing separation, and the soft component rests with contact pressure against the contact face, which face either comprises the hard component or likewise comprises the soft component.

The cross section of the soft and hard components may vary over the course of the sealing contour, which is why various parting edge cross sections are shown.

It will be understood that each of the elements described above, or two or more together, may also find a useful application in other types of constructions differing from the types described above.

While the invention has been illustrated and described as embodied in a hand power tool, it is not intended to be limited to the details shown, since various modifications and structural changes may be made without departing in any way from the spirit of the present invention.

Without further analysis, the foregoing will so fully revel the gist of the present invention that others can, reveal applying current knowledge, readily adapt it for various applications without omitting features that, from the standpoint of prior art, fairly constitute essential characteristics of the generic or specific aspects of the invention.

What is claimed as new and desired to be protected by Letters Patent is set forth in the appended claims.

What is claimed is:

1. A hand power tool, comprising a housing having at least two housing parts, sealing means providing mounting of said housing parts on one another fluid-tightly, said housing parts having short sides with which said housing parts abut against one another with interposition of said sealing means, said sealing means being fixed non-detachably and as an integrated part on one of said housing parts,
wherein said parts at a point where they abut one another are configured as a tongue-and-groove connection, positioned longitudinally along the short sides, said sealing means being located in an area of partner faces of said tongue-and-groove connection, said sealing means being configured to remain in position before the housing is assembled and when the housing is disassembled, wherein said sealing means are configured to remain in a permanent position and further are configured so that the sealing means cannot be disassembled from said short sides without causing damage either to the housing parts or to the sealing means, wherein said housing parts are formed as injection molded parts, so that said sealing means formed as injection molded parts are injection molded on said housing parts during manufacture of said housing parts, such that said housing parts and said sealing means are produced simultaneously as a single, unitary, one-piece part.

2. A hand power tool as defined in claim 1, wherein said housing parts have flat sides with which they abut against one another.

3. A hand power tool as defined in claim 2, wherein said housing parts abut against one another with said flat sides so that they are radially spaced apart from one another and overlap one another.

4. A hand power tool as defined in claim 1, wherein said sealing means are formed as sealing means which are integrally injection molded onto said housing parts, said housing parts being composed of harder plastic, and said sealing means being composed of softer, elastic plastic.

5. A hand power tool as defined in claim 4, wherein said sealing means are composed of grease-and-oil-resistant plastic.

6. A hand power tool as defined in claim 1, wherein said one housing part at a point where it has said sealing means is provided with an indentation.

7. A hand power tool as defined in claim 6, wherein said indentation is formed as a groove.

8. A hand power tool as defined in claim 1, wherein each of said housing parts has a point at which it abuts another of said housing parts, said sealing means being formed as an integrally injection molded sealing means provided at said point where said housing parts abut one another.

9. A hand power tool as defined in claim 1, wherein said sealing means are configured as a lip.

10. A hand power tool as defined in claim 9, wherein said lip is configured as a bearing seat.

11. A hand power tool as defined in claim 1, wherein said sealing means are located in said partner faces of said tongue-and-groove connection.

12. A hand power tool as defined in claim 1, wherein said sealing means is located at said partner faces of said tongue-and-groove connection.

13. A hand power tool as defined in claim 1, wherein said housing parts are configured as said tongue-and-groove connection at a butt seam.

14. A hand power tool, comprising a housing having at least two housing parts, sealing means providing mounting of said housing parts on one another fluid-tightly, said housing parts having short sides with which said housing parts abut against one another with interposition of said sealing means, said sealing means being fixed non-detachably and as an integrated part on a respective side on one of said housing parts or on both of said housing parts, said sealing means being configured to remain in position when the housing is disassembled, wherein said sealing means are configured to remain in a permanent position and further are configured so that the sealing means cannot be disassembled from said short sides of the disassembled housing parts without causing damage either to the housing parts or to the sealing means.

* * * * *